June 4, 1957 J. E. BOUGHTWOOD 2,794,854

MULTICHANNEL COMMUNICATION SYSTEM

Filed Aug. 20, 1953 3 Sheets-Sheet 1

INVENTOR.
J. E. BOUGHTWOOD

BY Edward R. Hyde Jr.

ATTORNEY

June 4, 1957 J. E. BOUGHTWOOD 2,794,854

MULTICHANNEL COMMUNICATION SYSTEM

Filed Aug. 20, 1953 3 Sheets-Sheet 2

INVENTOR.
J. E. BOUGHTWOOD
BY Edward R. Hyde Jr.
ATTORNEY

June 4, 1957 J. E. BOUGHTWOOD 2,794,854

MULTICHANNEL COMMUNICATION SYSTEM

Filed Aug. 20, 1953 3 Sheets-Sheet 3

INVENTOR.
J. E. BOUGHTWOOD

BY Edward R. Hyde Jr.

ATTORNEY 2,794,854
Patented June 4, 1957

2,794,854

MULTICHANNEL COMMUNICATION SYSTEM

John E. Boughtwood, Halesite, N. Y., assignor to The Western Union Telegraph Company, New York, N. Y., a corporation of New York Application August 20, 1953, Serial No. 375,422

6 Claims. (Cl. 178—66)

This invention relates to an improved method and means of grouping and translating channels of a multichannel carrier communication system whereby certain losses are minimized to provide a system of high operating efficiency.

Efficient utilization of the frequency spectrum of wire lines or radio relay carrier systems dictate frequency bands of approximately 3000 cycles. This band width has been chosen because it will accommodate a single telephone circuit, a single high speed facsimile circuit or a plurality of telegraph circuits. In a telegraph transmission system it is customary to divide the 3000 cycle band into 16 or more transmission channels. These transmission channels are generally grouped into two identical sub-bands each of which occupies the lower half of the 3000 cycle voice frequency band. This grouping of the channels provides certain initial economies and operating advantages. For example, since the two groups comprise channels of identical frequencies, a minimum variety of equipment is required. The terminal carrier equipmnt is thereby standardized and may be interchangeably used for either group. After the various channels are individually modulated at the sending terminal, one group is translated to occupy the upper half of the voice band just above its associated group. At this point, with all the channels adjacent each other filling the voice band, they are fed to the outgoing carrier.

It is seen that in the above described system, the sub-bands are composed of the lower frequency telegraph channels. This introduces two fundamental deficiencies in the system that the present invention is designed to correct. First, when the carrier frequency is not very high compared to the frequency of the intelligence signal, a substantial keying loss results from the relationship of these two frequencies. This is due to the random manner in which the sending key turns the carrier off and on in the case of amplitude modulation. Since the keying unit is not phased with the carrier frequency, the carrier may be going through any part of a cycle when it is opened and closed by the sending key. This operation produces a signal that is lengthened or shortened at random resulting in a loss of signal. A similar loss results in a frequency modulation system. It has been found that this loss is directly proportional to the ratio of signal frequency to carrier frequency *fs*/*fc*.

A second disadvantage of employing sub-bands composed of the low frequency channels is the difficulty of eliminating the carrier frequency from the detected or recovered signal at the receiving terminal of the system. If a sharp cut-off filter is used for this purpose, its non-linearity of phase response distorts the wave form of the intelligence signal. Other filters permit some of the carrier frequency to reach the receiving instrument resulting in losses similar to interference.

Both of these deficiencies of the conventional system are overcome by the present invention. Stated broadly, a wide band communication spectrum is divided into a plurality of narrow channels. These channels are grouped into two identical sub-bands each of which initially occupies the upper half of the wide band. One of the sub-bands is then translated to a position just below the associated sub-band to fill the wide band. Since the sub-bands are composed of the higher frequency channels, the ratio *fc*/*fs* is decreased thereby decreasing the above described keying loss. Also, the greater separation of the signal frequency from the carrier frequency makes possible the elimination of the carrier frequency from the detected signal at the receiving end of the system.

It is therefore an object of this invention to provide an improved multichanel carrier communication system.

Another object is to minimize certain losses in a multichannel carrier communication system by a method and means of grouping and translating the various channels of such a system.

Another object of this invention is to substantially eliminate the keying loss in a system of the general character described.

A further object of the present invention is to provide a system wherein the carrier frequency can be readily separated from the detected intelligence signals.

These and other advantages will become apparent from the following description taken with the drawings in which.

Figure 1:
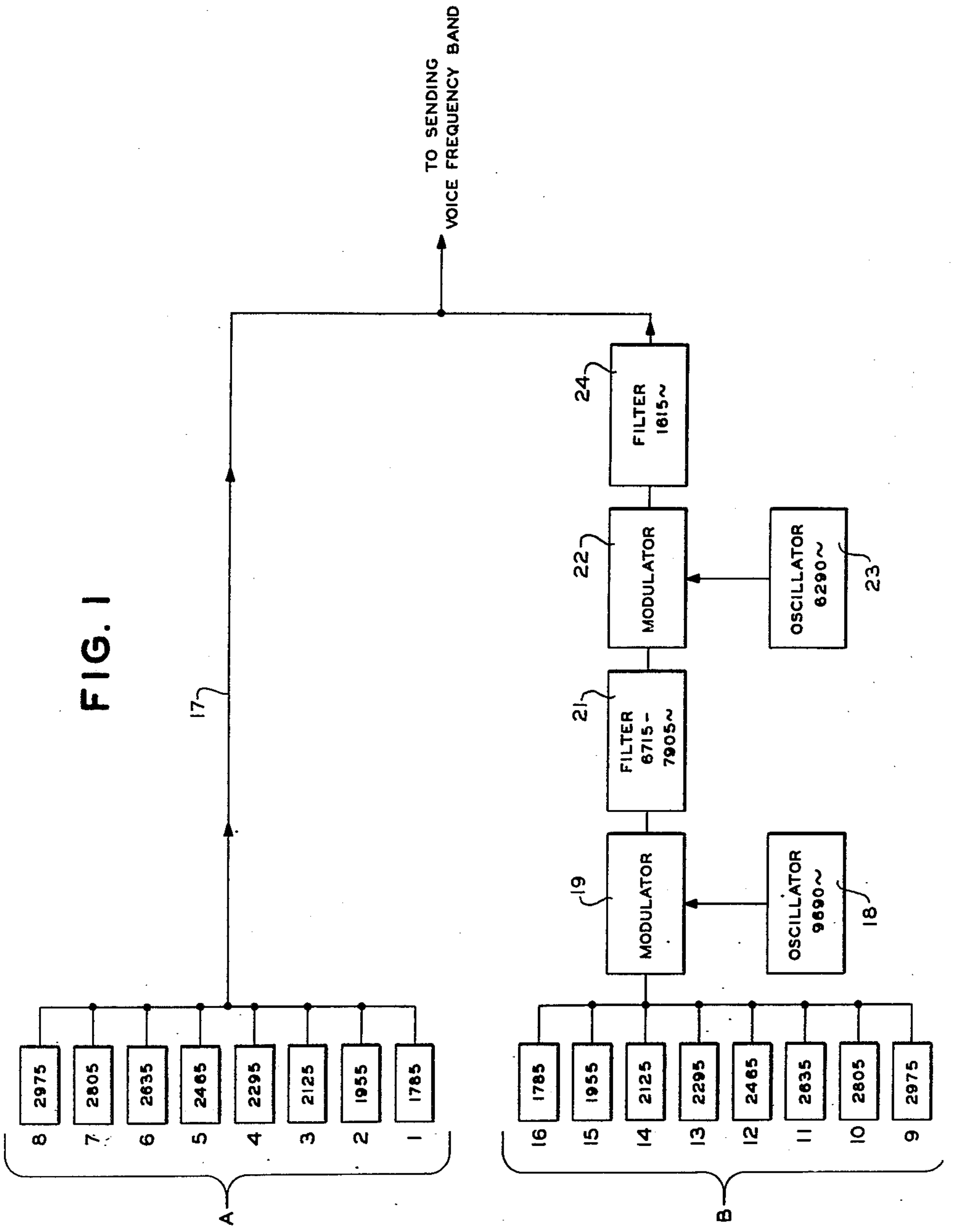
Fig. 1 is a schematic representation of the arrangement and grouping of channels at the transmitting terminal illustrating the principles of the present invention.

Referring now to Fig. 1, the voice band of 3000 cycle width is divided into sixteen channels numbered 1 through 16. These channels are grouped into two identical sub-bands A and B, each of which occupies the upper half of the 3000 cycle band. As here illustrated, each sub-band comprises eight transmitting channels, the nominal or center frequencies of which extend from 1785 cycles to 2975 cycles with a 170 cycle separation between each channel. It is of course understood that the frequency values used throughout are for illustrative purposes only, and other values could be equally well used. Also, the number of channels, herein shown as sixteen, could likewise be varied without departing from the scope or spirit of the invention.

Figure 3:
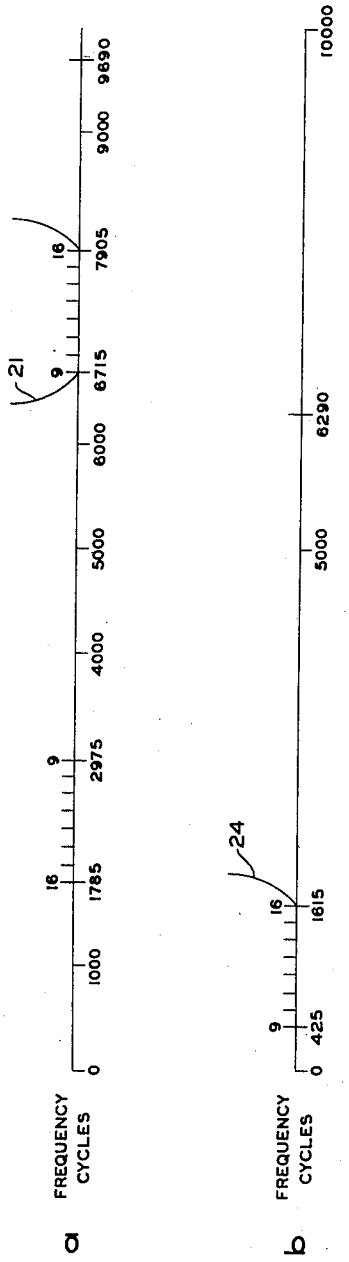
Fig. 3 is a graphic representation of the channel grouping and filter arrangement at the sending terminal.

Channels 1 to 8 which make up sub-band A are connected by circuit 17 to the sending voice frequency band. Channels 9 to 16 comprising sub-band B are translated to a position in the frequency spectrum below sub-band A. Since this translation is relatively small, and would introduce problems of filter and modulator design if made directly, a translation is first made to a relatively high frequency followed by a second translation to the desired position. Also, this arrangement makes it possible to conserve the mid-band guard space that would have to be provided between sub-band filters if the translation were made in one step. This is accomplished by first passing channels 9 to 16 to modulator 19 wherein they are translated by a 9690 cycle signal from oscillator 18. Choosing the lower side bands, the output of modulator 19 is fed to filter 21 designed to pass a frequency band of 6715 to 7905 cycles. These frequencies are then passed to modulator 22 which is supplied with a 6290 cycle signal from oscillator 23 whereby the sub-band A now occupies the range of 425 to 1615 cycles. In this position, the channels are passed to the sending voice band through low pass filter 24. This translation is graphically shown in Fig. 3. As therein illustrated, channels 9 to 16 are initially within the range of 1785 to 2975 cycles. After being modulated by the 9690 cycle signal, the channels then occupy the 6715 to 7905 cycle range where the unwanted side-bands are filtered out by filter 21. The next translation by the 6290 cycle signal, as shown by Fig. 3(*b*), positions channels 9 to 16 in the desired range of 425 to 1615 cycles where they are passed by low pass filter 24.

Figure 2:
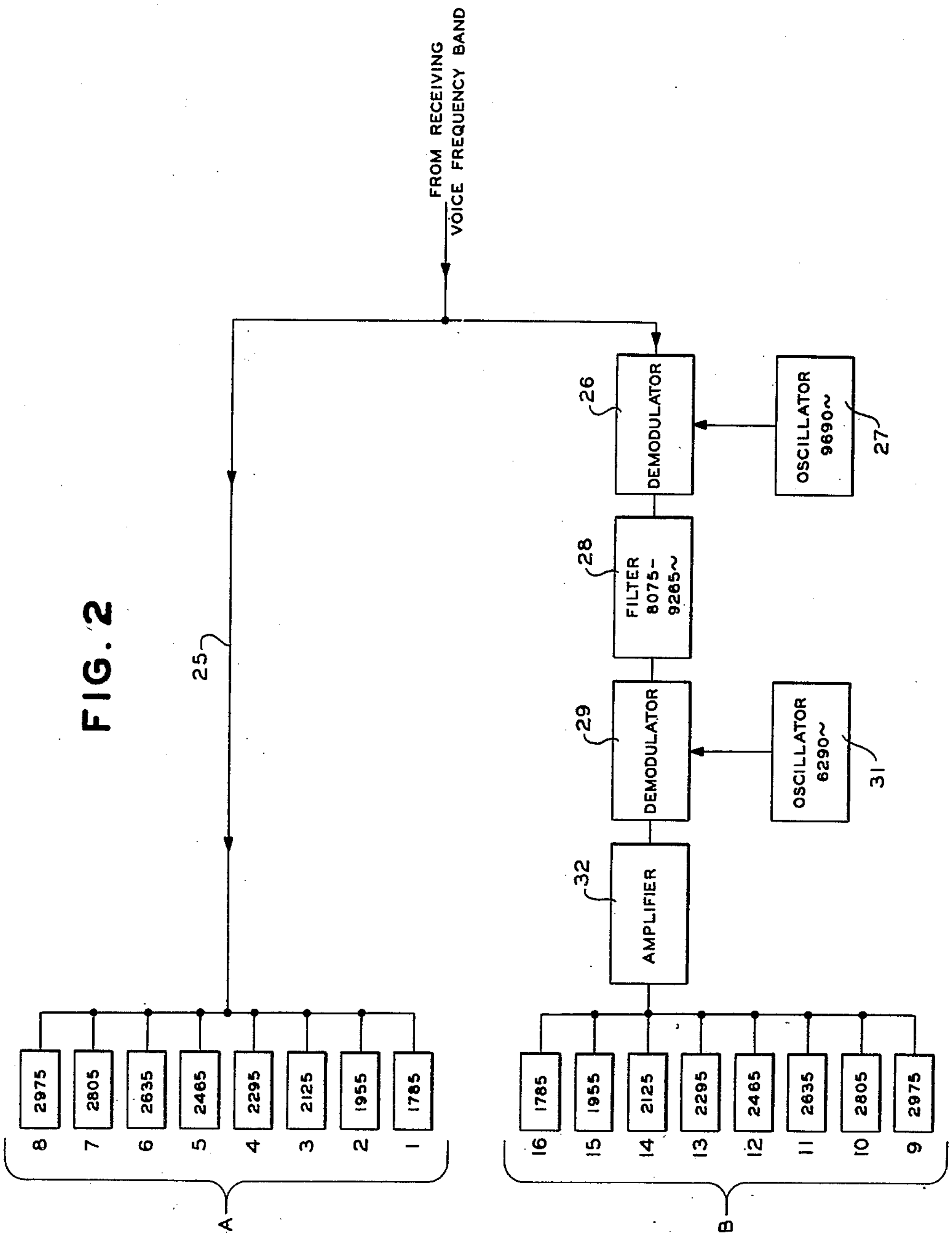
Fig. 2 is a schematic representation of the channel grouping at the receiving terminal.
Figure 4:
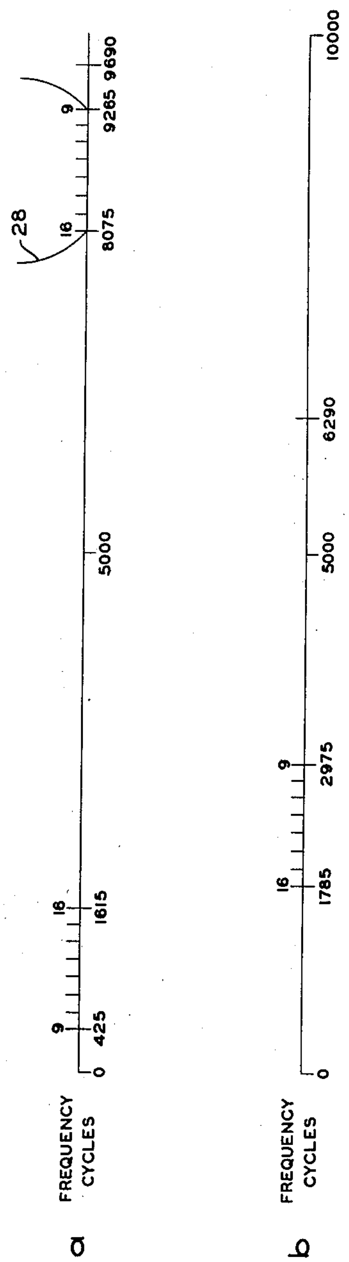
Fig. 4 is a graphic representation of the channel grouping and filter arrangement at the receiving terminal.

Referring now to Fig. 2, the band of frequencies is received from the receiving voice band, and channels 1 to 8 are applied by means of circuit 25 to receiving channels 1 to 8. Channels 9 to 16 are passed to demodulator 26 which is supplied with a 9690 cycle signal from oscillator 27. From demodulator 26 the frequencies are applied to demodulator 29 through band pass filter 28. Oscillator 31 of 6290 cycles effects a second frequency translation to reposition channels 9 to 16 in the upper half of the voice band where they are amplified by amplifier 32 and applied to receiving channels 9 to 16. The frequency translation at the receiver is shown by Fig. 4 wherein channels 9 to 16 are received in the range of 425 to 1615 cycles, translated by a 9690 cycle signal to the frequency range of 8075 to 9265 cycles and filtered by band pass filter 28. Fig. 4(*b*) illustrates the second translation by the 6290 cycle signal to position sub-band B in the 1785 to 2975 cycle range of receiving channels 9 to 16.

Although the invention has been disclosed with reference to a specific embodiment thereof, it is understood that this is not to be considered as limiting the scope of the invention as defined by the appended claims.

What is claimed is:

1. In a carrier telegraph system wherein a plurality of carrier channels are transmitted within a wide frequency band, means for sub-dividing the wide band into a plurality of narrow band units occupying the upper half of the frequency band, means for grouping said band units into two identical sub-bands whereby each of said sub-bands occupy the upper half of said wide band, and means for translating one of said sub-bands to a position below the other sub-band thereby substantially filling said wide band frequency spectrum for transmission.

2. In a carrier communication system wherein a plurality of carrier channels are transmitted over a wide frequency band, means for subdividing the wide frequency band into a plurality of narrow carrier channels each of which occupies the upper half of the wide frequency band, means for grouping said carrier channels into a first and second sub-band whereby the channels of said first sub-band correspond in frequency to the channels of said second sub-band, each of said sub-bands initially occupying the upper half of the frequency spectrum of said wide band, means for translating said second sub-band to a high frequency level, means to filter said second sub-band at said high frequency level and means to translate said second sub-band to a position in the wide band below said first sub-band thereby substantially filling said wide frequency band for transmission.

3. In a carrier telegraph transmission system wherein a plurality of carrier channels are transmitted within a voice frequency band, a system of grouping said channels comprising means for subdividing the voice band frequency spectrum into a plurality of narrow frequency channels occupying the upper frequency portion of the voice band, means for grouping the frequency channels into a first and second group, each of said groups being located in the upper frequency portion of said voice band and means for translating said second group into position below said first group.

4. In a carrier communication system wherein a plurality of carrier channels are transmitted within a wide frequency band, a system for reducing keying loss comprising means for subdividing the wide band into a plurality of narrow band channels all of which occupy the upper half of the wide frequency band, means for grouping the said channels into a first sub-band and a second sub-band, the channels comprising said first sub-band having frequencies corresponding to the frequencies of the channels comprising said second sub-band, each of said sub-bands occupying the upper half of the wide frequency band, and means for translating said second sub-band into position below said first sub-band thereby filling said wide band frequency spectrum prior to transmission.

5. In a carrier communication system wherein a plurality of carrier channels are transmitted within a wide frequency band, a system of subdividing said wide frequency band comprising means for subdividing the wide frequency band into a plurality of narrow band channels each of which occupies the upper half of the wide frequency band, means for grouping said channels into a first and second sub-band, the channels in each of said sub-bands having corresponding frequencies and each sub-band occupying the high frequency half of said wide band, means for translating the second sub-band to a high frequency level, means for filtering said second sub-band at the high frequency level, and means for translating the second sub-band to a position below said first sub-band thereby filling said wide frequency band for transmission.

6. In a carrier telegraph system wherein a plurality of carrier channels are transmitted over a 3000 cycle voice band, a system for substantially reducing keying loss comprising means for subdividing said voice band into a plurality of narrow carrier channels each of which occupies the upper half of the voice band, means for subdividing said voice band into a first sub-band and a second sub-band, the carrier channels of said first sub-band corresponding in frequency to the carrier channels of said second sub-band, each of said sub-bands initially occupying the high frequency portion of said 3000 cycle voice band, means for translating said second sub-band to a high frequency level, means to filter said second sub-band at the high frequency level to eliminate unwanted frequencies, means to translate the second sub-band to a position in the 3000 cycle voice frequency band below said first sub-band thereby substantially filling said voice frequency band for transmissions.

References Cited in the file of this patent

UNITED STATES PATENTS 2,674,653 Rudolph et al. ---------- Apr. 6, 1954

OTHER REFERENCES

A nation-wide frequency-modulated telegraph network, F. B. Bramhall and L. A. Smith, "Electrical Engineering," vol. 7, issue 4, pages 338 to 342, published April 1951.